US007542153B2

(12) United States Patent
Park

(10) Patent No.: US 7,542,153 B2

(45) Date of Patent: Jun. 2, 2009

(54) METHOD AND APPARATUS FOR FAST FORMING IMAGES USING TONER

(75) Inventor: Cheol-woo Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 926 days.

(21) Appl. No.: 10/754,693

(22) Filed: Jan. 12, 2004

(65) Prior Publication Data

US 2004/0141199 A1 Jul. 22, 2004

(30) Foreign Application Priority Data

Jan. 18, 2003 (KR) ...................... 10-2003-0003473

(51) Int. Cl.
*G06K 15/00* (2006.01)
*H04N 1/40* (2006.01)

(52) U.S. Cl. ...................... 358/1.12; 358/1.18; 358/496

(58) Field of Classification Search ................ 271/3.17; 347/129; 358/1.12, 1.15, 1.16, 1.18, 498, 358/496; 400/624, 629
See application file for complete search history.

(56) References Cited

U.S. PATENT DOCUMENTS 5,512,927 A * 4/1996 Okamoto .................... 347/129
6,341,909 B1 1/2002 Fukui .......................... 400/629
6,724,506 B1 * 4/2004 Wang .......................... 358/498
2001/0033050 A1 10/2001 Kinoshita et al. .......... 271/3.17
2001/0033389 A1 10/2001 Kurihara .................... 358/1.12
2002/0061219 A1 * 5/2002 Suzuki ....................... 400/624
2004/0061875 A1 * 4/2004 Joo ............................ 358/1.5
2004/0141198 A1 * 7/2004 Otsuki ....................... 358/1.12

FOREIGN PATENT DOCUMENTS

| | | | |
|---|---|---|---|
| JP | 02103156 | * | 4/1990 |
| JP | 02134268 | * | 5/1990 |
| JP | 8142422 | | 6/1996 |
| JP | 08207357 | * | 8/1996 |
| JP | 2000272781 | | 10/2000 |
| JP | 2001341865 | | 12/2001 |
| JP | 2002086824 | | 3/2002 |
| KR | 1998-054991 | | 9/1998 |

OTHER PUBLICATIONS

Chinese Office Action for corresponding to Chinese Patent Application No. 200100059872 dated Jul. 14, 2006.
European Search Report; Dated: May 3, 2004.

* cited by examiner

*Primary Examiner*—Jerome Grant, II
(74) *Attorney, Agent, or Firm*—Staas & Halsey LLP

(57) ABSTRACT

A method and an apparatus form images efficiently using toner. The method, which is performed in an image forming apparatus to form images using toner, includes: rendering image data; deciding an amount of data of an image to be formed on a sheet using rendered results; and deciding a sheet feeding time point of a next sheet using a decided amount of data of the image. Accordingly, in contrast to a conventional image forming method, in which sheet feeding intervals are always constant when sheets of the same size are used, sheet feeding intervals may vary. Also, the amount of data of an image to be formed on a page is decided, and a sheet feeding time point of the next sheet may be variably set based on the decided amount of data, so that the next sheet having a smaller image-data-amount may be fed earlier. Therefore, a number of formed pages per minute may be increased, and images may be formed at high speed.

15 Claims, 2 Drawing Sheets

METHOD AND APPARATUS FOR FAST FORMING IMAGES USING TONER

CROSS-REFERENCE TO RELATED APPLICATIONS

This application claims the benefit of Korean Application No. 2003-3473, filed Jan. 18, 2003, in the Korean Intellectual Property Office, the disclosure of which is incorporated herein by reference.

BACKGROUND OF THE INVENTION

1. Field of the Invention

The present invention relates to an image forming apparatus to form images using toner, such as a laser printer, copier or the like, and more particularly, to a method and an apparatus to form images efficiently using toner by which images are formed at high speed.

2. Description of the Related Art

A conventional image forming apparatus using toner is described as follows.

A conventional image forming apparatus, for example, a laser printer, is comprised of a video controller (not shown), and a printer engine (not shown). Here, the video controller is comprised of a data transmitting/receiving portion (not shown) to receive image data transmitted from a host (not shown), and an image rendering portion (not shown) to perform rendering operations, such as reconstructing the received image data into dot data. At this time, the printer engine receives the rendered data output from the video controller, feeds a sheet, and forms an image on the fed sheet.

Here, in the printer engine, an image forming speed, i.e., a printing speed of an image, varies with a feeding speed of a sheet. For example, the printer engine satisfies a required PPM (pages per minute) by adjusting the speed of an engine motor and an interval between successive sheets. At this time, when the speed of the motor is set to be faster or the time interval between sheets is set to be shorter, the PPM is increased so that an image may be formed faster. However, there is a problem in which a jam may occur easily due to the shorter interval of feeding sheets so that an image cannot be formed normally. Here, a jam is an event in which, while a previous sheet is feeding, the next sheet is feeding together with the previous one or in which the next sheet is partially overlapping the previous one. Therefore, there is a limitation in increasing an image forming speed by simply increasing the motor speed.

In other words, to precisely meet the required PPM, a conventional image forming apparatus using toner repeatedly performs an operation of feeding a sheet from a sheet cassette at a predetermined interval of time. That is, the conventional image forming apparatus using toner feeds each sheet always at the same interval of time when sheets of the same size are continuously used to form a series of images. Therefore, in the conventional image forming apparatus using toner, there is a limitation in increasing the image forming speed only by increasing the speed of the engine motor without shortening the time interval between successive sheets.

SUMMARY OF THE INVENTION

To solve the above-described problems and/or other problems, an embodiment of the present invention provides a method of fast forming images using toner, by which the time when each sheet is fed may be changed according to an amount of data of an image to be formed on each sheet.

The an embodiment of present invention also provides an apparatus to form images efficiently using toner, by which the time when each sheet is fed may be changed according to an amount of data of an image to be formed on each sheet.

According to one aspect of the present invention, a method of fast forming images is used in an image forming apparatus to form images using toner. The method includes rendering image data, determining an amount of data of an image to be formed on a sheet using rendered results, and determining a sheet feeding time point of the next sheet using the decided amount of data of the image.

According to another aspect of the present invention, an apparatus forms images efficiently using toner. The apparatus includes a data receiving portion, a rendering portion, an image-data-amount deciding portion, and a sheet feeding time deciding portion. The data receiving portion receives image data and outputs the image data. The rendering portion renders the image data output from the data receiving portion and outputs rendered results. The image-data-amount deciding portion decides an amount of data of an image of each image page by using the rendered results input from the rendering portion and outputs a decided amount of data of the image. The sheet feeding time deciding portion decides a sheet feeding time of the corresponding next sheet by using the amount of data of the image of the image page input from the image-data-amount deciding portion and outputs a decided sheet feeding time point.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
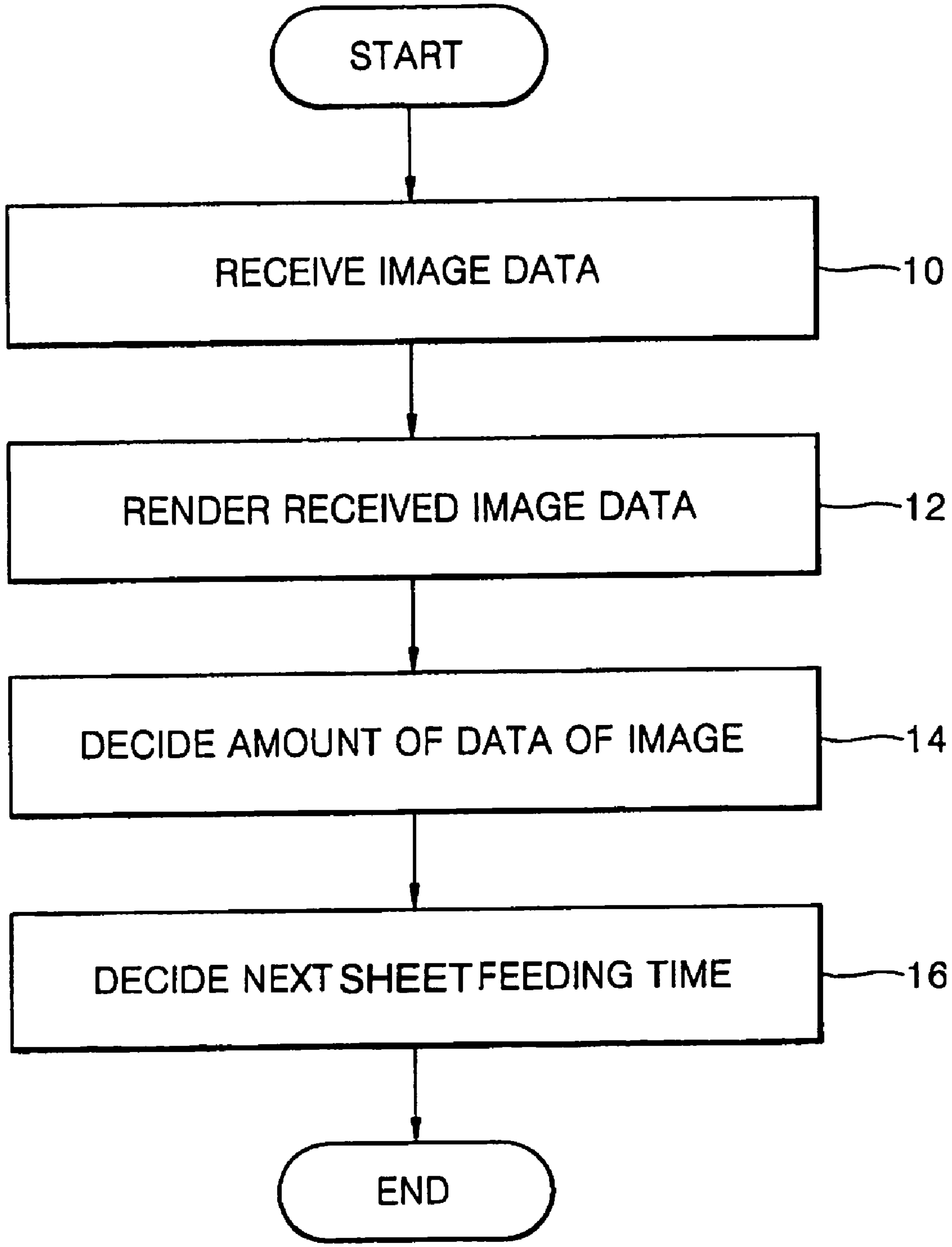
FIG. 1 is a flowchart illustrating a method of efficiently forming images using toner according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A method of efficiently forming images using toner according to an embodiment of the present invention will be described with reference to the attached drawing.

FIG. 1 is a flowchart illustrating a method of efficiently forming images using toner according to an embodiment of the present invention, which includes receiving transmitted image data and rendering the image data (operations 10 and 12), and the operations of deciding the amount of data of an image and deciding the next sheet feeding time (operations 14 and 16).

Referring to FIG. 1, in the method of efficiently forming images using toner according to an embodiment of the present invention, first, image data are received (operation 10). According to an embodiment of the present invention, image data may be received from the outside, for example, a host (not shown) (operation 10). According to another embodiment of the present invention, image data stored in and then read from the inside may be received (operation 10).

After operation 10, the apparatus performs rendering operations such as reconstructing image data transmitted from the outside or read from the inside into dot data per page (operation 12).

After operation 12, the amount of data of each image to be printed on each sheet (e.g., of paper) is decided using the rendered data output (operation 14). To this end, according to an embodiment of the present invention, information of image positions to be formed last on each sheet on which an image is to be formed determines an amount of data of each image using the rendered data output. For example, image data is checked to determine whether the image data of each image to be formed exists from the bottom of each image of each page to the top thereof by using the rendered data, and the amount of data of an image, i.e., the information concerning image positions, may be decided by the checked results. That is, image data is checked to determine how far the last image data of each image is positioned from the bottom of each page, and information concerning the position of the last image data of the image is determined.

The sheets that are input to receive toner may comprise paper, transparencies, various plastic materials, and any other suitable material to receive printing. Due to different thicknesses and consistencies of input sheets, the present invention may further include an adjustment to the sheet feeding time point of a next sheet in accordance with an optimized feeding time for the material and/or thickness of the input sheets.

After operation 14, the next sheet feeding time point is determined by using the determined amount of data of an image on each sheet (operation 16). When the information is determined as the amount of data of an image as described above, a corresponding next sheet feeding time point is determined by using the information (operation 16).

As a result, in contrast to a conventional method of forming images in which sheets are fed always at a constant interval of time when images are formed by continuously using sheets of the same size, the above-described method of fast forming images using toner according to an embodiment of the present invention may variably decide the next sheet feeding time when the last image data of an image is positioned at a relatively upper position of a sheet, so that the next sheet can be fed earlier.

For the convenience of describing an embodiment of the present invention more effectively, the size of a sheet is assumed to be A4, i.e., 210 (width)×297 (length) mm. At this time, there may be 56 divided bands lengthwise in a sheet. Here, the vertical width of a band is 5.6 mm. Therefore, to obtain information to be determined as the amount of data of an image in operation 14, i.e., in order to search for a number of the last image band in which the last image exists, image data is checked to determine whether image data exists in each band from the 56th band positioned at the lowermost of each page to the 1st band positioned at the uppermost of the page, i.e., in the direction in which the number of the bands decreases. Thus, while it is checked whether or not image data exist in each band in a page, the information on a position of the last image band found for a first time is decided using an amount of data of an image of the page. Here, in general, image data are not assigned to the three or four bottom bands of a page, since readability of the bottom bands is decreased when image exists in the three or four bottom bands. According to the information, a sheet to be used to form the next image may be fed earlier than the constant time point. That is, sheet feeding may be performed at variable intervals of time.

Now, the structure and operation of the apparatus to form images efficiently using toner according to an embodiment the present invention will be described with reference to the attached drawing.

Figure 2:
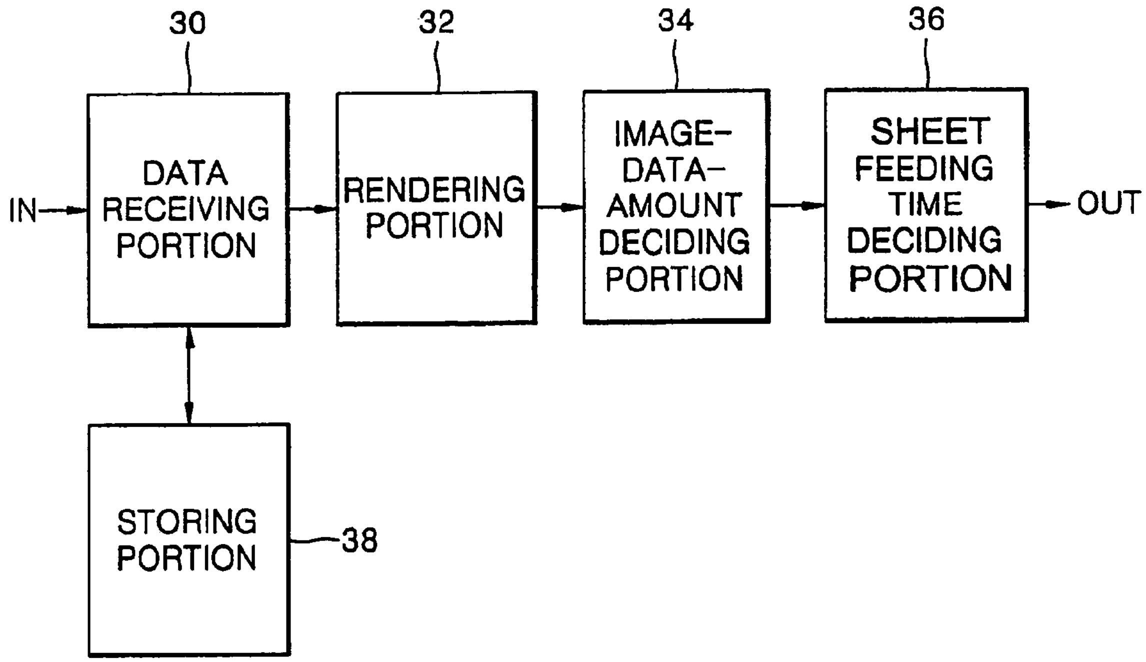
FIG. 2 is a block diagram of an apparatus to form images efficiently using toner according to an embodiment of the present invention.

FIG. 2 is a block diagram of an apparatus to form images efficiently using toner according to an embodiment of the present invention. The apparatus to form images efficiently is comprised of a data receiving portion 30, a rendering portion 32, an image-data-amount deciding portion 34, a sheet feeding time deciding portion 36, and a storing portion 38.

The apparatus to form images efficiently using toner, shown in FIG. 2, may perform the method of fast forming images shown in FIG. 1. Here, the apparatus to form images efficiently using toner may be a laser printer, copier, or the like, as described above.

According to an embodiment of the present invention, the apparatus to form images efficiently using toner, shown in FIG. 2, performs operation 10 shown in FIG. 1 using only the data receiving portion 30 without including the storing portion 38. In this case, the data receiving portion 30 shown in FIG. 2 receives image data transmitted from the outside, for example, a host (not shown) via an input terminal IN, and outputs the received image data to the rendering portion 32.

According to another embodiment of the present invention, the apparatus to form images efficiently using toner, shown in FIG. 2, includes the data receiving portion 30 and the storing portion 38 to perform operation 10 shown in FIG. 1. In this case, the storing portion 38 stores image data. At this time, the data receiving portion 30 reads image data from the storing portion 38, receives the image data read from the storing portion 38, and outputs the received image data to the rendering portion 32.

To perform operation 12, the rendering portion 32 renders the image data input from the data receiving portion 30, and outputs the rendered results to the image-data-amount deciding portion 34.

To perform operation 14, the image-data-amount deciding portion 34 decides the amount of data of image which is formed on a page depending on the rendered results input from the rendering portion 32, and outputs the decided amount of data of an image on each page to the sheet feeding time deciding portion 36. To this end, according to an embodiment of the present invention, the image-data-amount deciding portion 34 decides information of the position of the last image data of each page depending on the rendered results input from the rendering portion 32, and outputs the decided information as the amount of data of each image page to the sheet feeding time deciding portion 36. For example, the image-data-amount deciding portion 34 checks to determine whether image data exists from the bottommost of each page to the uppermost thereof using the rendered results input from the rendering portion 32, and may decide information concerning the amount of data of each image page according to the checked results.

To perform operation 16, the sheet feeding time deciding portion 36 decides a sheet feeding time point of the next sheet according to the amount of data of each image page input from the image-data-amount deciding portion 34, and outputs data of the sheet feeding time point via an output terminal OUT.

Here, when the apparatus to form images efficiently shown in FIG. 2 is a laser printer (not shown), the data on the sheet feeding time point decided by the sheet feeding time deciding portion 36 are output to a printer engine (not shown). At this time, the printer engine causes a sheet on which the next image is to be formed to be fed at the sheet feeding time output from the sheet feeding time deciding portion 36 via the output terminal OUT In this case, the apparatus to form images efficiently shown in FIG. 2 may be built in a video controller of a laser printer or the like.

The sheet feeding time deciding portion 36 serves to decide a sheet feeding time point of feeding a sheet for the next image, i.e., an image following the image being presently formed. At this time, to avoid jamming between the rear portion of the sheet on which an image is presently being formed and the next sheet for the next image, the sheet feeding time deciding portion 36 decides the next sheet feeding time point that is longer than a minimum time interval during which consecutive sheets are fed. For example, when an image forming apparatus continuously forms images on 21 A4 sheets per minute, the average time required for forming an image of a page is 60 sec/21 sheets=2.8 sec.

This period of 2.8 seconds to form an image of a page includes a time to form an image on the A4 sheet and a time to feed the next sheet. The time required to feed a sheet may vary more or less with the speed of a printer engine or the specifications of a printer. If the time to feed a sheet is assumed to be a time required to transfer a sheet about 70 mm along a sheet moving path to form images on 21 A4 sheets per minute in a conventional image forming method, an interval of 70 mm between paper sheets must be maintained at all times. In the method of fast forming images using toner according to an embodiment of the present invention, instead of always maintaining the interval of 70 mm, the interval may be changed to 30 mm or 40 mm according to the amount of data of an image so that the next sheet may be fed earlier, an image forming speed per minute can be increased.

As described above, since an interval between sheets may be decreased, i.e., a time interval between sheets may be shortened, after the data receiving portion 30, the rendering portion 32, the image-data-amount deciding portion 34, and the sheet feeding time deciding portion 36, which are shown in FIG. 2, perform their respective operations concerning an image to be currently formed and output respective results, the data receiving portion 30, the rendering portion 32, the image-data-amount deciding portion 34, and the sheet feeding time deciding portion 36 must immediately perform their respective operations concerning the image to be next formed. For example, when the same image is continuously formed on a plurality of sheets, or different image pages are continuously formed on respective sheets, after the rendering portion 32 outputs rendered results to the image-data-amount deciding portion 34, the rendering portion 32 renders image data of the next image to be formed while the image-data-amount deciding portion 34 decides the amount of data of an image using the rendered results. Similarly, after the image-data-amount deciding portion 34 outputs the decided amount of data of the image to the sheet feeding time deciding portion 36, the image-data-amount deciding portion 34 decides the amount of data of the image to be next formed while the sheet feeding time deciding portion 36 decides a sheet feeding time point using the amount of data of the image.

As described above, since, in the method and apparatus according to an embodiment of the present invention, the amount of data of an image of a page is decided, and then a sheet feeding time of the next sheet may be decided variably corresponding to the decided amount of data of the image, the next sheet subsequent to a sheet having a smaller image-data-amount may be fed earlier, and therefore, in contrast to a conventional image forming method in which sheet feeding intervals are always constant when the same size sheets are used, the number of pages per minute in which images are formed may be increased and images may be formed at high speed.

Clearly, the method of the present invention may be implemented using a tangible medium comprising at least one of: a memory, a computer storage disk, an application specific integrated circuit, a digital signal processor, and a field programmable array, wherein the tangible medium has stored thereon computer-executable instructions of efficiently forming images used in an image forming apparatus that uses toner, the instructions comprising: rendering image data to provide rendered results; and determining a sheet feeding time point of a next output sheet based on the rendered results and an amount of data of an image to be formed on a first output sheet.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of efficiently forming images used in an image forming apparatus to form images using toner, the method comprising:

rendering image data to provide rendered results;

determining an amount of data of an image to be formed on a sheet using the rendered results; and determining a sheet feeding time point of a next sheet using a decided amount of data of the image and variably setting the sheet feeding time point of the next sheet based on the decided amount of data, wherein the determining the amount of data of the image to be formed comprises determining information concerning a position of last image data to be formed last on a sheet by using the rendered results, and then the determining the sheet feeding time point comprises determining the sheet feeding time point by using the information.

2. The method according to claim 1, wherein the determining the amount of data of the image to be formed comprises determining image data to determine whether image data exist from a bottommost portion of each sheet to an upper portion thereof by using the rendered results to provide checked results, and determining the information by using the checked results.

3. The method according to claim 1, wherein the rendering the image data comprises receiving the image data transmitted from outside the image forming apparatus.

4. The method according to claim 1, wherein the rendering the image data comprises reading the image data from inside the image forming apparatus.

5. An apparatus to form images efficiently using toner comprising:

a data receiving portion receiving image data and outputting the image data;

a rendering portion to render the image data output from the data receiving portion, and outputting rendered results;

an image-data-amount deciding portion to decide an amount of data of an image of each image page by using the rendered results output from the rendering portion, and outputting a decided amount of data of the image; and a sheet feeding time deciding portion to decide a sheet feeding time of a corresponding next sheet by using the amount of data of the image of the image page output from the image-data-amount deciding portion and variably setting the sheet feeding time point of the next sheet based on the decided amount of data, and outputting a decided sheet feeding time point, wherein the image-data-amount deciding portion decides information on a position of image data to be formed last on a sheet by using the rendered results, and outputs the information decided as the amount of data of the image to the sheet feeding time deciding portion.

6. The apparatus according to claim 5, wherein the image-data-amount deciding portion determines whether image data exists to be formed from a bottommost portion of each image page to an upper portion thereof by using the rendered results to provide checked results, and decides the information by using the checked results.

7. The apparatus according to claim 5, wherein the data receiving portion receives the image data from outside the apparatus.

8. The apparatus according to claim 5 further comprising a storing portion storing the image data, wherein the data receiving portion reads the image data from the storing portion.

9. A method of efficiently forming images used in an image forming apparatus that uses toner, the method comprising:

rendering image data to provide rendered results; and determining a sheet feeding time point of a next output sheet based on the rendered results, and an amount of data of an image to be formed on a first output sheet, and variably setting the sheet feeding time point of the next output sheet based on the decided amount of data, wherein the determining the amount of data of the image to be formed comprises determining information concerning a position of image data to be formed last on a sheet by using the rendered results and using the information in determining the sheet feeding time point.

10. The method according to claim 9, wherein the determining the amount of data of the image to be formed comprises checking image data to determine whether image data exist from a bottommost portion of each sheet to an upper portion thereof by using the rendered results to provide checked results and determining the information by using the checked results.

11. An apparatus to form images efficiently using toner comprising:

a rendering portion to render the image data received and to output rendered results; and a data handling portion, to determine an amount of data of an image of each image page by using the rendered results and to determine a sheet feeding time point of a corresponding next sheet based on the amount of data of the image of the image page and to variably set the sheet feeding time point of the next sheet based on the determined amount of data wherein the data handling portion comprises;

an image-data-amount deciding portion to decide an amount of data of an image of each image page by using the rendered results output from the rendering portion. and outputting a decided amount of data of the image; and a sheet feeding time deciding portion to decide a sheet feeding time of a corresponding next sheet by using the amount of data of the image of the image page output from the image-data-amount deciding portion, and outputting a decided sheet feeding time point.

12. The apparatus according to claim 11, wherein the image-data-amount deciding portion decides information on a position of image data to be formed last on a sheet by using the rendered results, and outputs the information decided as the amount of data of the image to the sheet feeding time deciding portion.

13. The apparatus according to claim 11 wherein the image-data-amount deciding portion determines whether image data exists to be formed from a bottommost portion of each image page to an upper portion thereof by using the rendered results to provide checked results, and decides the information by using the checked results.

14. A tangible medium comprising at least one of: a memory, a computer storage disk, an application specific integrated circuit, a digital signal processor, and a field programmable array, wherein the tangible medium has stored thereon computer-executable instructions of efficiently forming images used in an image forming apparatus that uses toner, the instructions comprising:

rendering image data to provide rendered results; and determining a sheet feeding time point of a next output sheet based on the rendered results and an amount of data of an image to be formed on a first output sheet, and variably setting the sheet feeding time point of the next sheet based on the decided amount of data, wherein the deciding the amount of data of the image to be formed comprises determining information concerning a position of image data to be formed last on a sheet by using the rendered results and using the information in deciding the sheet feeding time point.

15. The tangible medium according to claim 14, wherein the deciding the amount of data of the image to be formed comprises checking image data to determine whether image data exist from a bottommost portion of each sheet to an upper portion thereof by using the rendered results to provide checked results, and determining the information by using the checked results.

* * * * *

UNITED STATES PATENT AND TRADEMARK OFFICE

CERTIFICATE OF CORRECTION

PATENT NO. : 7,542,153 B2
APPLICATION NO. : 10/754693
DATED : June 2, 2009
INVENTOR(S) : Cheol-Woo Park It is certified that error appears in the above-identified patent and that said Letters Patent is hereby corrected as shown below:

Column 7, Line 29, change “results,” to --results--.

Column 8, Line 3, after “data” insert --,--.

Column 8, Line 4, change “comprises;” to --comprises:--.

Column 8, Line 7, change “portion.” to --portion,--.

Column 8, Line 21, change “claim 11” to --claim 11,--.

Signed and Sealed this

Twenty-ninth Day of September, 2009

David J. Kappos

David J. Kappos
*Director of the United States Patent and Trademark Office*